US011620063B2

(12) United States Patent
Ito

(10) Patent No.: US 11,620,063 B2
(45) Date of Patent: Apr. 4, 2023

(54) INFORMATION PROCESSING APPARATUS AND CONTROL METHOD OF INFORMATION PROCESSING APPARATUS

(71) Applicant: CANON KABUSHIKI KAISHA, Tokyo (JP)

(72) Inventor: Hiroki Ito, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 237 days.

(21) Appl. No.: 16/806,732

(22) Filed: Mar. 2, 2020

(65) Prior Publication Data
US 2020/0293209 A1 Sep. 17, 2020

(30) Foreign Application Priority Data

Mar. 14, 2019 (JP) .............................. JP2019-047612

(51) Int. Cl.
G06F 3/06 (2006.01)

(52) U.S. Cl.
CPC ............ G06F 3/0634 (2013.01); G06F 3/065 (2013.01); G06F 3/0619 (2013.01); G06F 3/0653 (2013.01); G06F 3/0679 (2013.01)

(58) Field of Classification Search
CPC ...... G06F 3/0634; G06F 3/065; G06F 3/0619; G06F 3/0653; G06F 3/0679
See application file for complete search history.

(56) References Cited

U.S. PATENT DOCUMENTS

| 2010/0332863 | A1* | 12/2010 | Johnston | ................... G06F 1/26 713/300 |
| 2012/0060023 | A1* | 3/2012 | Park | ...................... G06F 9/4406 713/2 |
| 2012/0210169 | A1* | 8/2012 | Coile | .................. G06F 11/2069 714/22 |
| 2014/0281625 | A1* | 9/2014 | Younger | ............... G06F 1/3206 713/323 |
| 2015/0378841 | A1* | 12/2015 | Jayakumar | ............ G06F 9/4401 714/6.12 |
| 2019/0138407 | A1* | 5/2019 | Mehra | ................... G06F 9/4408 |
| 2019/0346904 | A1* | 11/2019 | Tannenberger | ......... G06F 13/14 |

FOREIGN PATENT DOCUMENTS

JP 2004-272309 A 9/2004

* cited by examiner

Primary Examiner — Jaweed A Abbaszadeh
Assistant Examiner — Gayathri Sampath
(74) Attorney, Agent, or Firm — Canon U.S.A., Inc. IP Division

(57) ABSTRACT

An information processing apparatus includes an ensuring circuit configured to maintain an operation of a first storage connected to a first system in a case where a detection unit detects reduction in voltage of a power supply. A control unit is configured to copy at least data necessary for activating the information processing apparatus from a second storage connected to a second system to the first storage in a case where the first storage is set not to store the data necessary for activating the information processing apparatus and a second storage is set to store the data necessary for activating the information processing apparatus.

17 Claims, 8 Drawing Sheets

FIG.3

| LBA RECEIVED FROM CPU | DESTINATION STORAGE | LBA OF DESTINATION STORAGE | Serial No. |
|---|---|---|---|
| 0xAAAA to 0xBBBB | STORAGE 300 | 0xXXXX to 0xYYYY | Serial No. AAA |
| 0xCCCC to 0xDDDD | STORAGE 310 | 0xZZZZ to 0xWWWW | Serial No. BBB |

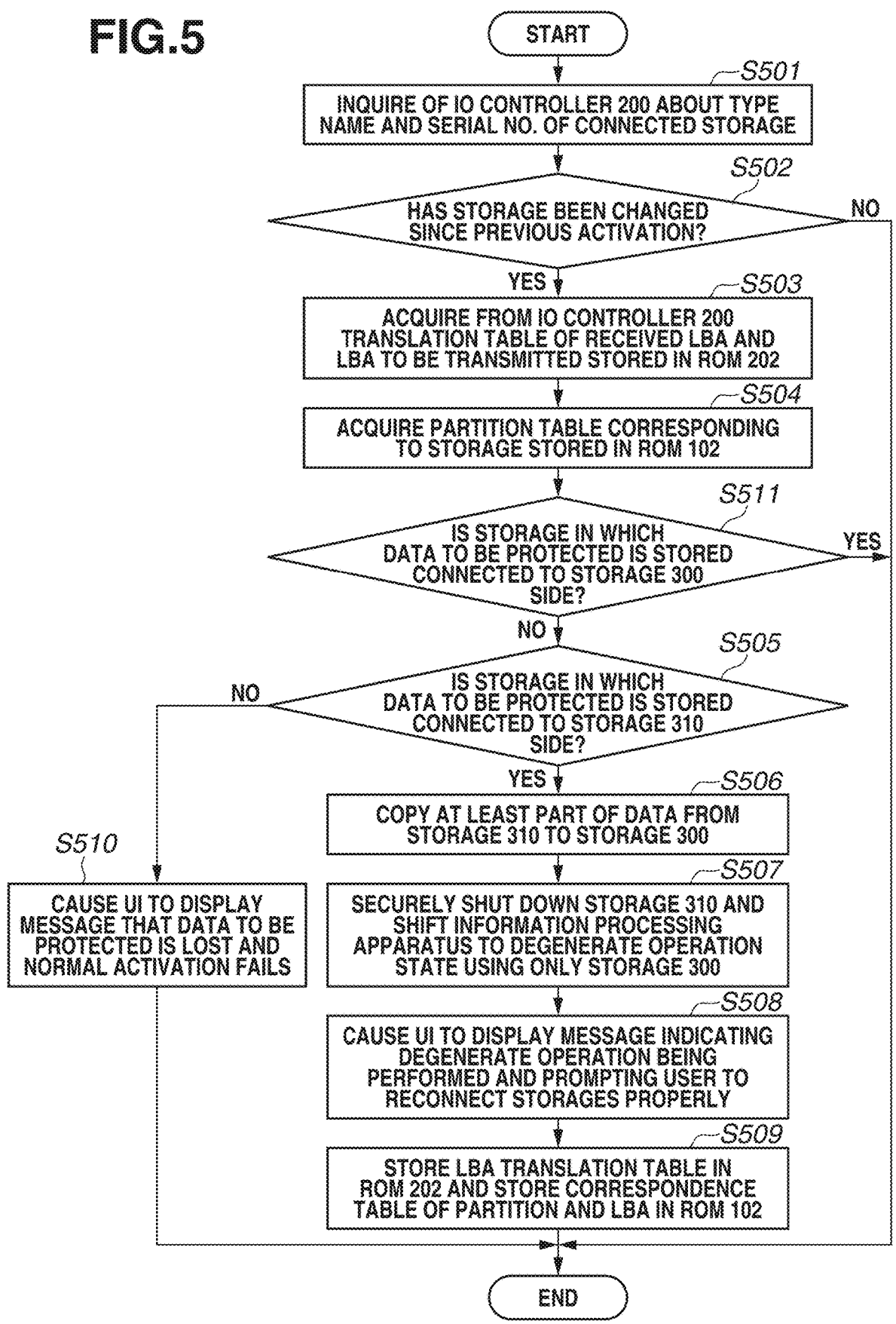

INFORMATION PROCESSING APPARATUS AND CONTROL METHOD OF INFORMATION PROCESSING APPARATUS

BACKGROUND

Field

The present disclosure relates to an information processing apparatus and a control method of the information processing apparatus.

Description of the Related Art

An information processing apparatus such as a multifunction printer (MFP) is provided with a storage device, such as a hard disk drive (HDD) and a solid state drive (SSD), to store programs for the apparatus, and setting data and image data stored by a user.

Such a storage device has a dedicated controller, a volatile cache memory, and a nonvolatile recording medium therein, and the dedicated controller writes data stored in the cache memory into the recoding medium at irregular intervals (cache flush operation).

An instantaneous interruption or a power failure that occurs at the time of writing data into these storage devices leads to a loss of data if data remains in a cache of the nonvolatile memory and a power source is turned off before the cache flush operation is completed.

To address this issue, a configuration in which a power ensuring circuit is mounted is known. The power ensuring circuit ensures a power supply until the completion of a cache flush operation so as not to lose data due to the failure of the cache flush operation performed in the storage at irregular intervals at the time of shutdown such as the power failure. Japanese Patent Application Laid-Open No. 2004-272309, for example, proposes a method of switching connection of a power supply line of an external storage device to a backup power supply such as a battery when a power failure or the like occurs and data remains in a cache memory, to secure a power supply for the duration of the cache flush operation.

SUMMARY

According to an aspect of the present disclosure, an information processing apparatus includes a storage control unit configured to control a storage connected to a first system and a storage connected to a second system, a power supply unit configured to supply power to an information processing apparatus, a power source control unit configured to control power supply to the first storage and power supply to the second storage, a detection unit configured to detect reduction in voltage of the power supply, and an ensuring circuit arranged in the first system and configured to maintain an operation of the first storage when the detection unit detects the reduction in voltage of the power supply. The storage control unit is configured to copy at least data necessary for activating the information processing apparatus from the second storage to the first storage, in a case where the first storage is set not to store the data necessary for activating the information processing apparatus and the second storage is set to store the data necessary for activating the information processing apparatus.

Further features of the present disclosure will become apparent from the following description of exemplary embodiments with reference to the attached drawings.

BRIEF DESCRIPTION OF THE DRAWINGS

FIG. 3 is a Logical Block Addressing (LBA) translation table included in a read-only memory (ROM) of the IO controller.

FIG. 5 is a flowchart for describing an operation in a case where storages have been exchanged with each other since previous activation.

DESCRIPTION OF THE EMBODIMENTS

Figure 1:
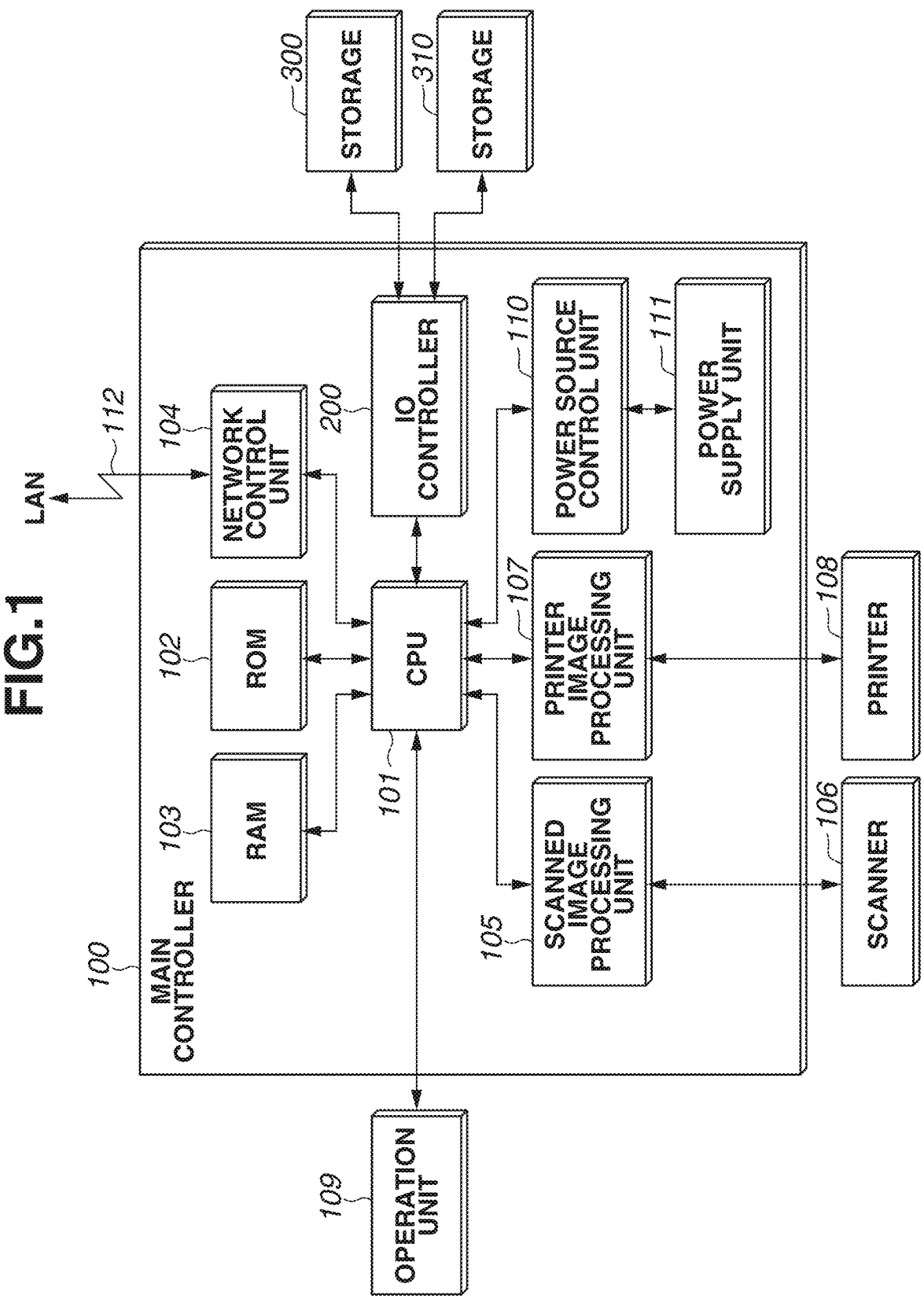
FIG. 1 is a block diagram of an information processing apparatus.

FIG. 1 is a block diagram of an information processing apparatus according to a first exemplary embodiment. A system configuration of a multifunction printer (MFP) will be described as one example of the information processing apparatus with reference to FIG. 1. The present exemplary embodiment, however, is not limited to this configuration and can be applied to an information processing apparatus having a configuration including a plurality of storage devices.

The information processing apparatus according to the present exemplary embodiment includes a main controller 100 that controls the entirety of the information processing apparatus, storages 300 and 310 that store data, a scanner 106 that scans an original document; and a printer 108 that prints the original document, and an operation unit 109.

A detailed configuration of the main controller 100 will be described. The main controller 100 includes a central processing unit (CPU) 101, a read-only memory (ROM) 102, a random access memory (RAM) 103, a network control unit 104, a scanned image processing unit 105, a printer image processing unit 107, a power source control unit 110, a power supply unit 111, and an input-output (IO) controller 200.

The CPU 101 is a controller that controls the entire system of the information processing apparatus, performs system control and arithmetic processing, and executes an operating system (OS) and an application. Specifically, a program, which has been read from the ROM 102, is loaded in the RAM 103 and executed by the CPU 101.

The ROM 102 stores the program to be executed by the CPU 101 and setting information. The ROM 102 may a flash ROM.

The RAM 103 stores a control program to be executed by the CPU 101 and is used as a temporary work area.

The network control unit 104 is a network interface (I/F) and transmits image data, which has undergone image processing in the information processing apparatus, to an external information processing apparatus (not illustrated), via a local area network (LAN) 112. The network control unit 104 receives image data from the external information processing apparatus in a similar manner.

The scanned image processing unit 105 performs image processing on image data received from the scanner 106. The processed image data is stored in either the storage 300 or the storage 310 via the IO controller 200.

The scanner 106, which is an image input device, irradiates an image on a sheet serving as an original document and scans the image with charge-coupled device (CCD) line sensors (not illustrated) to convert the image into an electric signal as raster image data (image data). The generated image data is transmitted to the scanned image processing unit 105.

The printer image processing unit 107 performs image processing on the received image data. The processed image data is transmitted to the printer 108. The processed image data is temporarily stored in the storage 300 or the storage 310. The stored image data is read from the storage and transmitted to the printer 108.

The printer 108, which is an image output device, prints the processed image data as the image on a sheet.

The operation unit 109, which is a device such as a touch panel provided with both a display function and an operation function, has a role of displaying input image data and a role of transmitting information input by a user of the system to the CPU 101.

The power source control unit 110 performs ON/OFF control of a power source to various units of the information processing apparatus and sequence control, in response to an instruction from the CPU 101.

The power supply unit 111 generates and provides at least one low-voltage power source to various units using electric power supplied from an external power source (not illustrated), in response to an instruction from the power source control unit 110.

The IO controller 200 performs control of transmission and reception of data to and from the storage 300 and the storage 310. In the present exemplary embodiment, the IO controller 200 will be described as a controller that controls a connected device in conformity with a Serial Advanced Technology Attachment (SATA) interface standard. However, the IO controller 200 is not limited thereto and the device may be connected using other interfaces such as Peripheral Component Internet Express (PCIe).

The LAN 112 is a local area network that is used for communication with the information processing apparatus and the external information processing apparatus (not illustrated).

The storage 300 and the storage 310 are nonvolatile storage devices. The storage 300 and the storage 310 are configured to use a flash memory (e.g., SSD), but the storage 300 and the storage 310 may be a magnetic device and a magnetic device, respectively, or may be a magnetic device and a flash memory, respectively.

Figure 2:
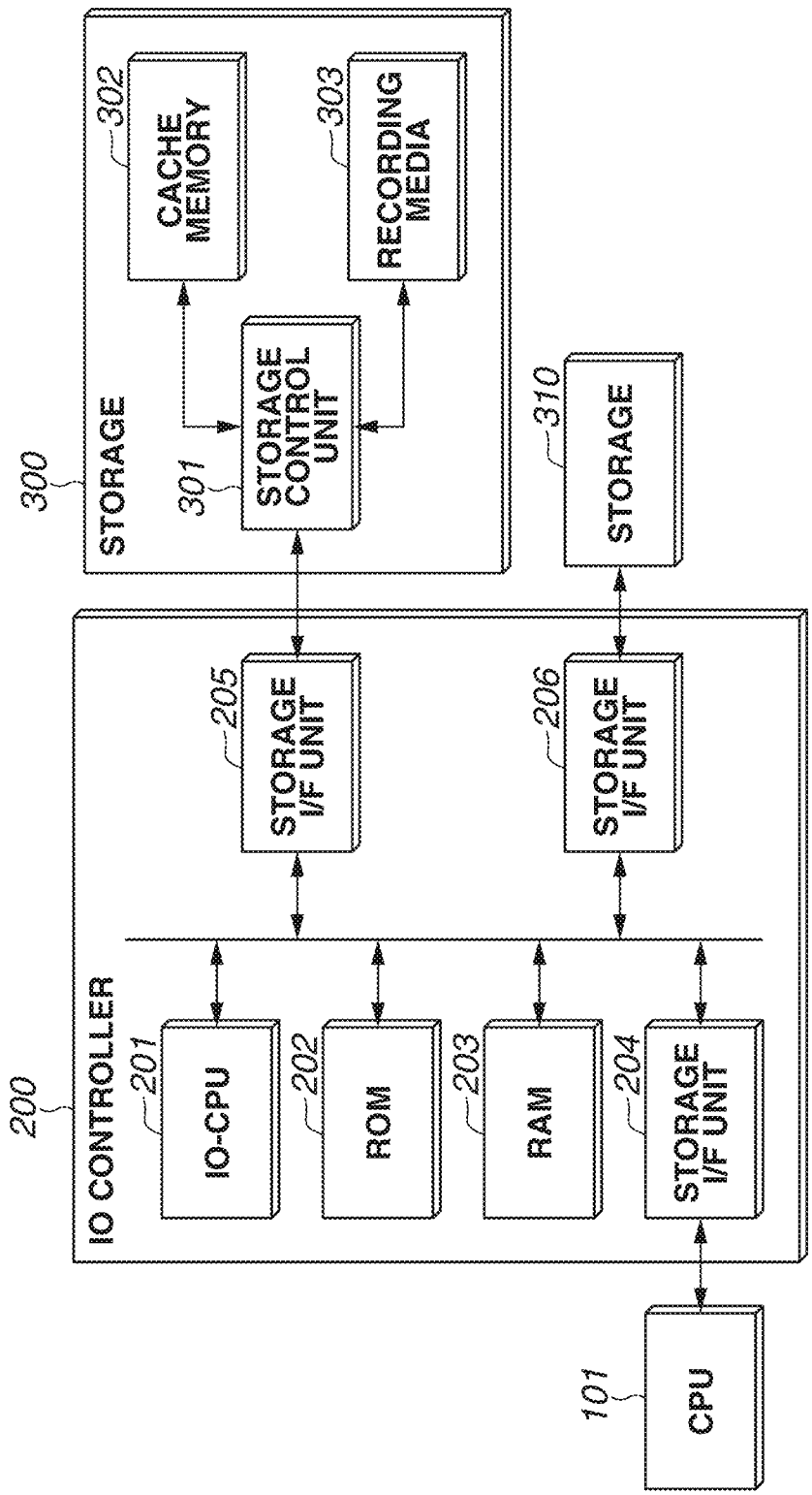
FIG. 2 is a block diagram of an input-output (IO) controller and a storage.

FIG. 2 illustrates a detailed configuration of the IO controller 200 and the storage 300.

The IO controller 200 includes an IO-CPU 201, a ROM 202, a RAM 203, and storage I/F units 204, 205, and 206, which are connected to one another through a communication bus.

The IO controller 200 functions as a communication bridge between the CPU 101 and the storage 300 and between the CPU 101 and the storage 310.

The IO-CPU 201 performs system control of the IO controller 200, arithmetic processing, and Advanced Technology Attachment (ATA) command processing. Specifically, a program, which has been read from the ROM 202, is loaded in the RAM 203 and executed by the CPU 101.

The ROM 202 stores a control program of the IO-CPU 201, data of setting values for various modes, information about a storage that is connected and under the control of the ROM 202. The ROM 202 is a flash ROM and can be rewritten.

The RAM 103 stores a control program to be executed by the IO-CPU 201 and is used as a temporary work area.

The storage I/F unit 204 is connected to the main controller 100 and communicates with the CPU 101 in the main controller 100 in conformity with the SATA standard.

The storage I/F unit 205 is connected to the storage 300 and communicates with the storage 300 in conformity with the SATA standard.

The storage I/F unit 206 is connected to the storage 310 and communicates with the storage 310 in conformity with the SATA standard.

The IO-CPU 201 performs reception processing of the ATA command transmitted from the CPU 101 through the storage I/F unit 204. The IO-CPU 201 performs transmission processing of the ATA command to the storage 300 through the storage I/F unit 205 and to the storage 310 through the storage I/F unit 206.

The IO-CPU 201 performs reception processing of the ATA command from the storage 300 through the storage I/F unit 205 and from the storage 310 through the storage I/F unit 206. The IO-CPU 201 performs transmission processing of the ATA command to the CPU 101 through the storage I/F unit 204.

The storage 300 includes a storage control unit 301, a cache memory 302, recording medium 303. The storage control unit 301 is connected to the cache memory 302 and to the recording media 303 through a communication bus.

The storage control unit 301 controls the entire storage 300 and is in charge of communicating with the IO controller 200.

The cache memory 302 is a volatile storage unit to temporarily hold data received by the storage control unit 301 from the IO controller 200.

The recording medium 303 is a nonvolatile storage unit and is, for example, a magnetic disc or an inverted AND (NAND)-type flash memory.

When the recording medium 303 is the magnetic disc, the storage 300 is called a hard disc drive (HDD). When the recording medium 303 is the NAND-type flash memory, the storage 300 is called a solid-state drive (SSD).

The storage control unit 301 writes data in the cache memory 302 into the recording medium 303 at irregular intervals. This operation is a cache flush and is performed independently of the IO controller 200.

The configuration of the storage 310 is the same as that of the storage 300, and thus redundant description thereof is omitted.

The operation of the IO-CPU 201 will be described in detail.

The IO-CPU 201 acquires storage information from the storages 300 and 310 under the control of the IO-CPU 201, and stores and manages the storage information in the ROM 202. The information about the storages 300 and 310 acquired by the IO-CPU 201 is, for example, information of Self-Monitoring, Analysis and Reporting Technology (S.M.A.R.T.).

The IO-CPU 201 determines whether the write command is to be transmitted to the storage 300 or to the storage 310, based on a destination Logical Block Addressing (LBA) of the write command from the CPU 101.

The IO-CPU 201 reads out an address translation table, which is illustrated as an example in FIG. 3, from the ROM 202 and refers to the address translation table. The address translation table stores the LBA (logical address) received from the CPU 101 and a storage to which a command is transmitted and the LBA (physical address) of the destination storage in association with each other. The address translation table stores a serial number of a storage used as the storage 300 and a serial number of a storage used as the storage 310. The address translation table can be rewritten.

The IO-CPU 201 determines whether the write command is to be transmitted to the storage 300 or to the storage 310, based on the address translation table. When the write command of the LBA from 0xAAAA to 0xBBBB is transmitted from the CPU 101 to the IO-CPU 201, the IO-CPU 201 performs address translation of the LBA to the LBA of the storage 300 (from 0xXXXX to 0xYYYY) and transmits the write command to the storage 300.

Figure 4:
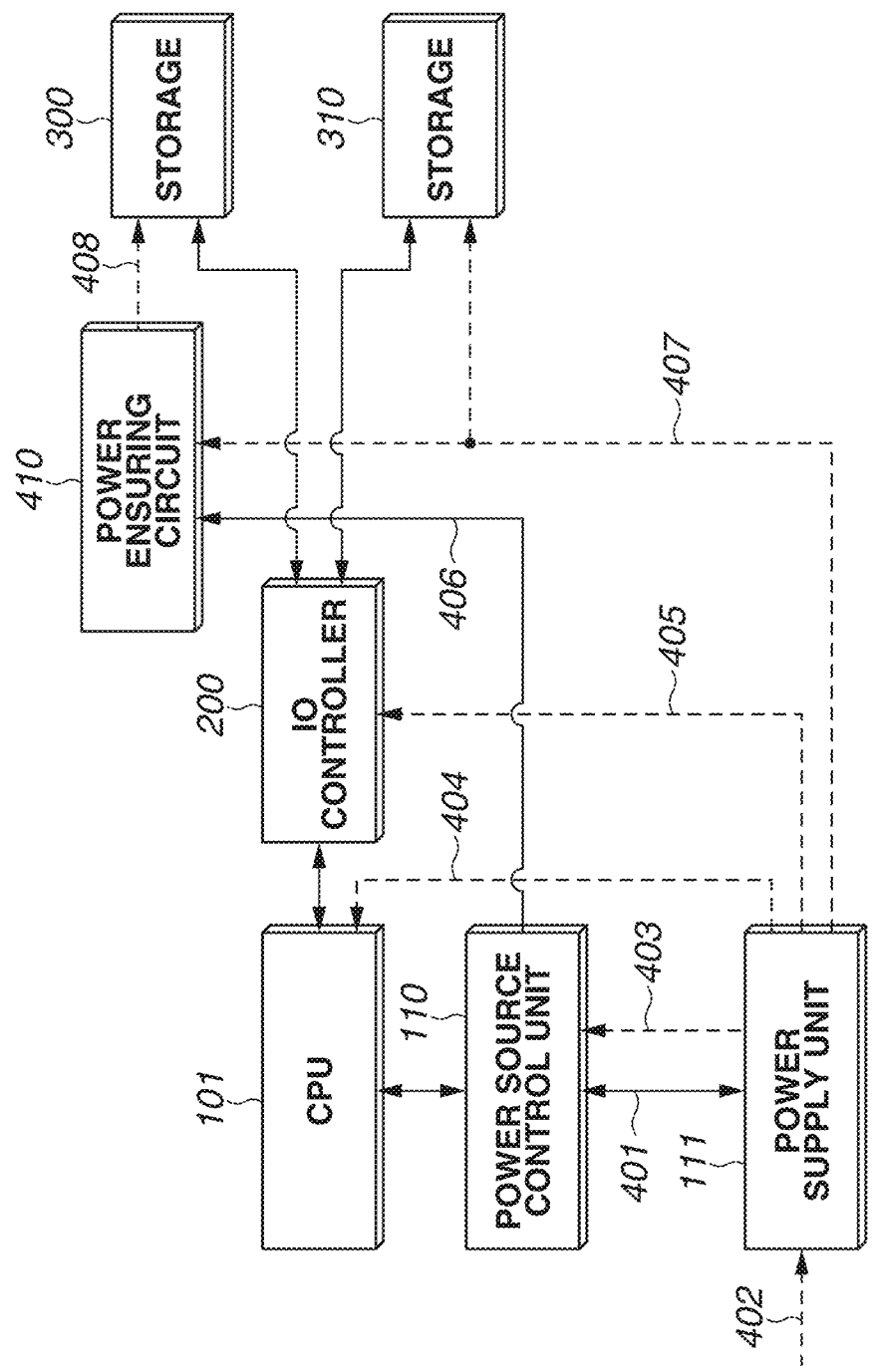
FIG. 4 is a block diagram of power supply lines to supply power from a power supply unit.

FIG. 4 is a schematic block diagram illustrating the power supply to the various units of the information processing apparatus and how an instruction for providing the power supply is given. In FIG. 4, a solid line indicates a communication line, and a broken line indicates a power supply line.

A power supply sequence of the information processing apparatus is controlled by the power source control unit 110, and the power source control unit 110 is connected to the CPU 101 and operates in response to an instruction form the CPU 101.

The power supply unit 111 is connected to the power source control unit 110 through a power control line 401 and generates a plurality of low voltage power sources using electric power supplied from an external power source 402 in response to an instruction from the power source control unit 110.

The power supply unit 111 supplies voltage to various devices through power supply lines 403, 404, 405, and 407.

A power ensuring circuit 410 supplies voltage to the storage 300 or maintains voltage of the storage 300 through a power supply line 408. In the following description, in a connection system of the IO controller 200 to the storages, a storage connected to a system in which the power ensuring circuit 410 ensures voltage is the storage 300. A storage connected to a system in which the power ensuring circuit 410 does not ensure voltage is the storage 310.

The following describes an example of how the power ensuring circuit 410 supplies voltage to the storage 300 or maintains voltage in the storage 300.

In a normal operation, the power ensuring circuit 410 supplies voltage supplied from the power supply unit 111 through the power supply line 407 to the storage 300.

When the external power source 402 stops, even if only instantaneously, due to a power failure or the like, the power source control unit 110 detects reduction in voltage of the external power source 402 and notifies the power supply unit 111 of the reduction in voltage through the power control line 401. The power source control unit 110 notifies the power ensuring circuit 410 that a power shutdown has occurred and notifies the CPU 101 that the power shutdown has occurred. While the configuration in which the power source control unit 110 includes a power supply monitoring unit that detects reduction in voltage of the power source, another power supply monitoring unit that monitors the voltage of the power source may be provided in addition to the power source control unit 110. In this case, the power supply voltage monitoring unit notifies the power source control unit 110 of the reduction in voltage of the external power source 402, when the power supply voltage monitoring unit detects the reduction in voltage.

The CPU 101 issues an instruction to start the cache flush operation to the storage through the IO controller 200 when the power source control unit 110 notifies the CPU 101 that the power shutdown has occurred.

Upon receiving the notification that the power shutdown has occurred from the power source control unit 110, the power ensuring circuit 410 switches a power source to a power source to be used during the power failure (not illustrated), and supplies power to the storage 300 through the power supply line 408.

The method of supplying power during the power failure may a method of switching a power source to a charged capacitor, a charged battery, or the like, and supplying power until the cache flush operation during the power failure is completed. The method of supplying power during the power failure may be a method of disconnecting (interrupting) the power supply line 408 to the storage 300 from a power supply line to other parts so that the storage 300 may use remaining power (electric charge), so as to maintain the power supply as long as possible until the cache flush operation is completed. The method only needs to ensure the power supply from the time when the power shutdown occurs to the time when the cache flush operation is completed, and the exemplary embodiment is not limited to these methods.

These methods enable the storage 300 to complete the cache flush operation even if the power shutdown occurs after the IO controller 200 executes a write instruction to the storage 300 under the control of the IO controller 200.

FIG. 5 is a flowchart for explaining an operation to be performed by the CPU 101 when the information processing apparatus is activated according to the present exemplary embodiment.

In step S501, the CPU 101 transmits, to the IO controller 200, a command to inquire about device type names and serial numbers of a storage connected as the storage 300 and a storage connected as the storage 310. In other words, the CPU 101 transmits, to the IO controller 200, a command to inquire about device type names and serial numbers of a storage connected to the system in which voltage is ensured and a storage connected to the system in which voltage is not ensured.

In step S502, the CPU 101 determines whether at least one of the storage 300 and the storage 310 currently connected has been changed, based on the device information stored in the ROM 102 and related to the storages connected when the information processing apparatus was previously activated.

If at least one of the storages has been changed since the information processing apparatus was previously activated (YES in step S502), the processing proceeds to step S503. If at least one of the storages has not been changed since the previous activation (NO in step S502), the activation processing ends.

In step S503, the CPU 101 inquires of the IO controller 200 about information about the LBA translation tables at write time and read time of the previous activation, the information being stored in the ROM 202.

In step S504, the CPU 101 acquires a partition table stored in ROM 102 and set in accordance with the serial number of the storage at the time of the previous activation. The partition table is typically set in conformity with a standard to be stored in an area (not illustrated) dedicated to the partition table in each storage. The partition table is stored in ROM 102 such that partition table information in such a typical storage and a serial number of the storage are associated with each other.

In step S511, the CPU 101 compares the storage information acquired in step S501, the LBA translation table acquired in step S503, and the partition table acquired in step S504 with each other. With this processing, the CPU 101 determines, based on the partition table, if the storage in which data to be protected is stored is connected as the storage 300. Specifically, the CPU 101 determines if the storage connected as the storage 300 at the time of the previous activation is connected to the storage 300 side (system in which voltage is ensured), based on a serial number of the storage.

If the storage in which the data to be protected is stored is connected as the storage 300 (YES in step S511), the processing ends. On the other hand, if the storage in which the data to be protected is stored is not connected as the storage 300 (NO in step S511), the processing proceeds to step S505.

In step S505, the CPU 101 determines whether the storage in which the data to be protected is stored is connected as the storage 310, based on the storage information, the LBA translation table, and the partition table acquired in step S501, step S503, and step S504, respectively. Specifically, the CPU 101 determines whether the storage connected as the storage 300 at the time of the previous activation is connected to the storage 310 side (system in which voltage is not ensured), based on the serial number of the storage.

If the CPU 101 determines that the storage in which data to be protected is stored is connected as the storage 310 (YES in step S505), the processing proceeds to step S506. If the CPU 101 determines that the storage in which data to be protected is stored is not connected as the storage 310 (NO in step S505), the processing proceeds to step S510.

As illustrated in FIG. 4, the above is based on the premise that the power ensuring circuit 410 is on the storage 300 side. When the power ensuring circuit 410 is on the storage 310 side, the CPU 101 determines whether the storage in which data to be protected is stored is connected as the storage 300 in step S505.

In step S506, the CPU 101 copies at least part of data from the storage 310 to the storage 300. Specifically, the data to be copied includes at least data about firmware and an application. The data about the firmware and the application is data necessary for a partial operation of the MFP and necessary for at least displaying an error status or the like to the user, so that a copy of the data is left in the storage 300.

Alternatively, a user copies data about setting values to operate the MFP in a degenerate mode to use only some of the functions of the MFP such as print and scan functions. The data to be copied is not limited thereto.

In step S507, the CPU 101 securely shuts down the storage 310. Specifically, the CPU 101 disconnects (unmounts) the storage 310 from the system, and shifts the information processing apparatus into a state where no read/write processing is performed on the storage 310 or no cache flush operation occurs. Subsequently, the CPU 101 controls the power source control unit 110 to turn off the power source to the storage 310.

In step S508, the CPU 101 starts a degenerate operation using only the storage 300 and causes a user interface (UI) (operation unit 109) to display a message indicating that the degenerate operation is being performed and prompting the user to reconnect the storage 300 and the storage 310 properly because the storage 300 and the storage 310 have been exchanged with each other and connected.

In step S509, the CPU 101 issues an instruction to store the LBA translation table in the ROM 202 of the IO controller 200. The CPU 101 stores a correspondence table of a partition and the LBA set corresponding to the type name and the serial number of the current storage in the ROM 102, and ends the processing.

When the CPU 101 ends the processing through the flow in the case of YES in step S505, the MFP shifts to the degenerate operation state, in which only some of functions can be used. In this state, functions that can be used are varied depending on contents of the data copied in step S506 as described above.

In step S510, the CPU 101 causes the operation unit 109 to display a message that normal activation fails because the storage in which the data to be protected is stored is not connected, and ends the processing.

Figure 6A:
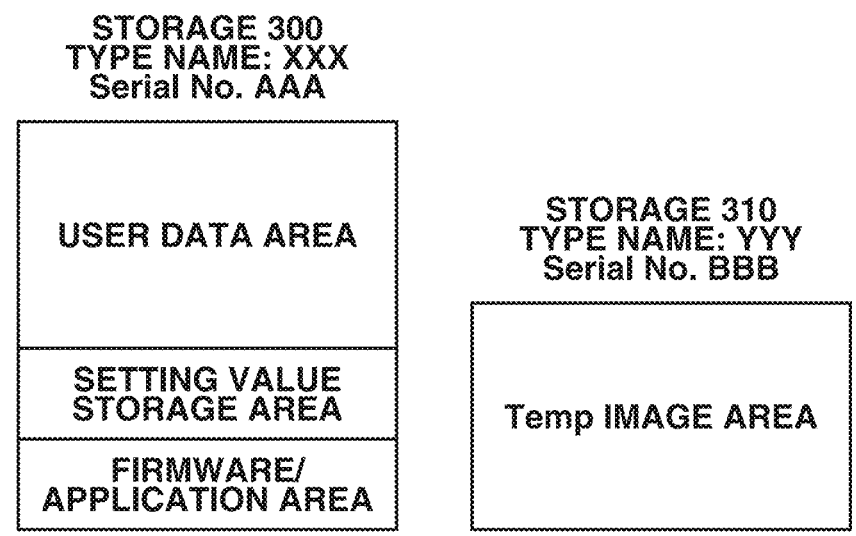
FIGS. 6A, 6B and 6C are diagrams each illustrating a partition configuration in a case where the storages have been exchanged with each other since the previous activation.
Figure 6B:
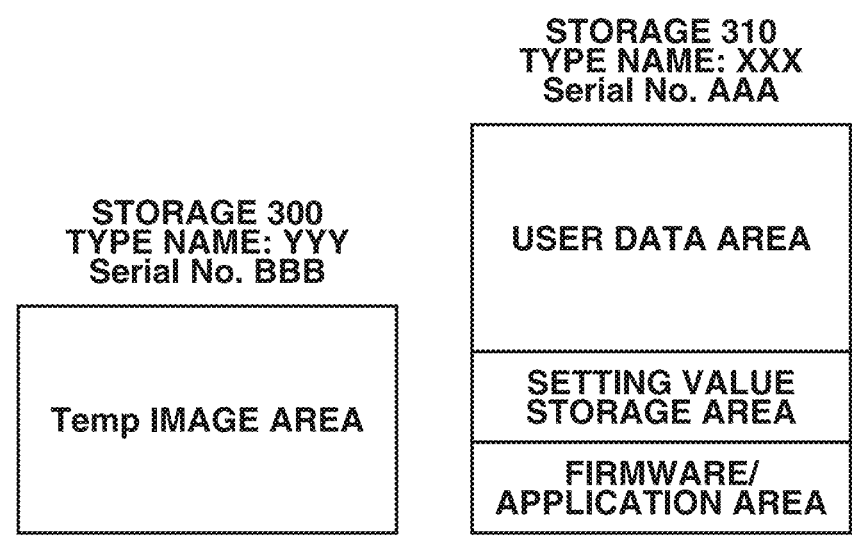
Figure 6C:
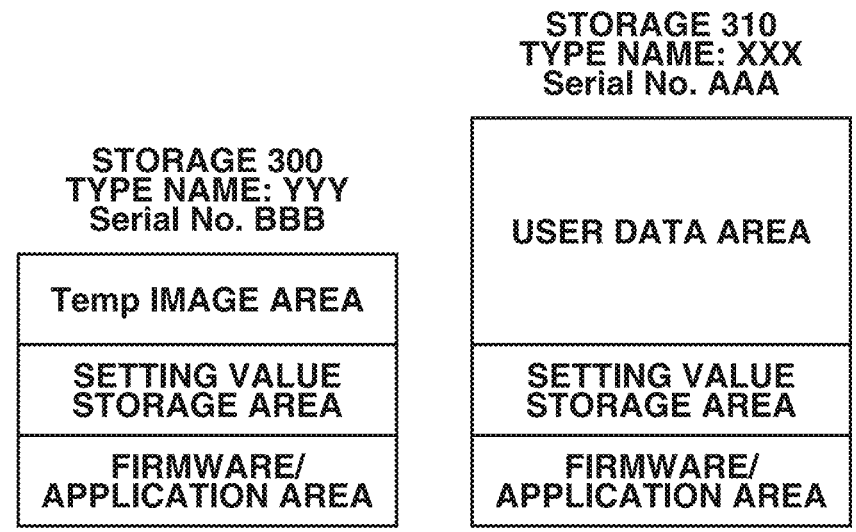

The following describes an exemplary partition configuration in a case where the storages have not been exchanged with each other since the previous activation, an exemplary partition configuration in a case where the storages have been exchanged with each other, and an exemplary partition configuration to which the present exemplary embodiment has been applied, with reference to FIGS. 6A to 6C.

FIG. 6A illustrates an exemplary data partition configuration of the storage 300 and the storage 310 in a state where normal activation has succeeded at the time of the previous activation. A storage (hereinafter referred to as storage AAA) having a serial number AAA is connected as the storage 300, and a storage (hereinafter referred to as storage BBB) having a serial number BBB is connected as the storage 310. The storage AAA and the storage BBB may have the same capacity or different capacities.

Partitions for a firmware/application area, a setting value storage area, and a user data area are allocated to the storage AAA as the storage 300. The firmware/application area is an area that is used for operations of firmware and an application required to operate the system of the information processing apparatus and to load data, and that is necessary for operating the information processing apparatus. The setting value storage area is an area in which device setting values and the like set by the user to the information processing apparatus are stored. The user data area is an area in which original document image data or the like stored in a user BOX is stored.

A Temp image area is allocated to the storage BBB serving as the storage 310. The Temp image area is an area in which an image is temporarily stored when the information processing apparatus performs a copy operation, a print operation, or a scan operation. The Temp image area is an image area that requires high-speed reading and writing when the information processing apparatus is demanded to perform the copy operation, the print operation or the scan operation at high speed.

The storage AAA having the firmware/application area and the setting value storage area that are required for the activation is connected to a side with the power ensuring circuit 410. Should the power shutdown occur due to the power failure during writing to the storage AAA, a power supply for time required for the cache flush is ensured, so that data, which otherwise is lost due to the failure of the cache flush, is protected. The storage BBB, which is connected to a side without the power ensuring circuit 410, has the possibility of losing data due to the failure of the cache flush when the power shutdown occurs.

FIG. 6B illustrates the exemplary partition configuration of the storage AAA and the storage BBB, in which the two storages are exchanged with each other and connected at the time of next activation of the information processing apparatus. While the example in which the storages are exchanged with each other is described, the storage originally connected to the side with the power ensuring circuit only needs to be connected to the side without the power ensuring circuit. A storage other than the storage AAA only needs to be connected to the side with the power ensuring circuit.

In FIG. 6B, the storage BBB is connected to the side with the power ensuring circuit 410. The storage BBB is used as the storage 300. For this reason, the Temp image area is allocated to the storage 300.

The storage AAA is connected to the side without the power ensuring circuit 410. The storage AAA is used as the storage 310. Partitions between the firmware/application area, the setting value storage area, and the user data area are allocated to the storage 310.

In this state, the storage AAA having the partitions between the firmware/application area, the setting value storage area, and the user data area is allocated to the side without the power ensuring circuit 410. For this reason, the occurrence of the shutdown due to the power failure during writing to the storage 310 may cause loss of data if the cache flush operation is not completed in time.

In the configuration of the present exemplary embodiment, part of data is copied from the storage AAA serving as the storage 310 to the storage BBB serving as the storage 300. This configuration is illustrated in FIG. 6C.

In FIG. 6C, the firmware/application area and the setting value storage area are copied from the storage AAA used as the storage 310 to the storage BBB used as the storage 300, and serve as new partitions. The remaining area in the storage BBB is reconfigured as the Temp image area. If data including the partitions is copied, the partition configuration of the storage 300 is changed, and thus it goes without saying that the contents of the standard partition table stored in the storage 300 are also changed.

Assume that if the storages before the activation are exchanged with each other after the activation as illustrated in FIGS. 6B and 6C, the user sees the message displayed on the UI (operating unit 109) and prompting the user to reconnect the storages properly in step S508, and then returns the exchanged storages back to the original state. (The storages are exchanged back to the state as illustrated in FIG. 6A.)

In this case, the MFP is activated by using the firmware/application area and the setting value storage area of the reconnected storage 300 (storage AAA). The original storage 310 (storage BBB) reconnected this time included only the Temp image area originally stored therein, and now the firmware/application area and the setting value storage area are stored in the storage 310. If data in the firmware/application area and the setting value storage area of the storage AAA, from which the areas are copied, is updated, the contents may be stored in the firmware/application area and the setting value storage area of the storage AAA, from which the areas are copied.

The storages having been exchanged as illustrated in FIG. 6C are exchanged back to the original state, i.e., the storages are reconnected as illustrated in FIG. 6A, so that the information processing apparatus can be operated as normal.

As described above, the present exemplary embodiment can simultaneously reduce a circuit size, cut costs of circuits and prevent a loss of data to be protected when the storages are exchanged.

Figure 7:
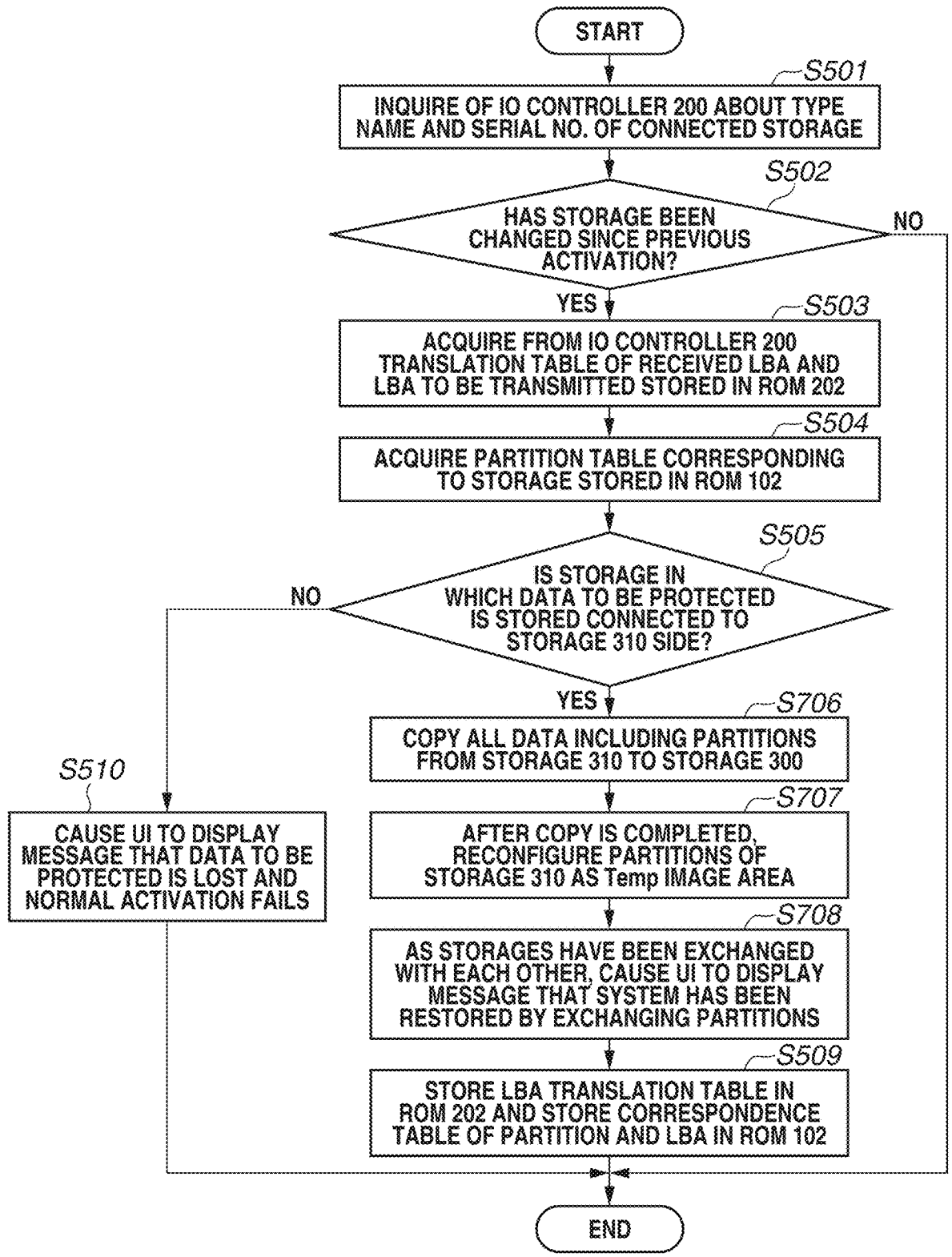
FIG. 7 is a flowchart for describing an operation in a case where the storages have been exchanged with each other since the previous activation.

The following describes a second exemplary embodiment with reference to FIGS. 7 and 8. In the first exemplary embodiment, when the storage in which data to be protected is stored is connected as the storage 310, only an important part of the data is copied to the storage 300, to which the power is supplied through the power ensuring circuit 410. In the second exemplary embodiment, on the other hand, when the storage in which data to be protected is stored is connected as the storage 310, all the data is copied to the storage 300, to which the power is supplied through the power ensuring circuit 410. When the partitions in the storage 310 are reconstructed, the contents of the storage 300 and the contents of the storage 310 are exchanged with each other.

The descriptions regarding FIGS. 1 to 4 are the same as those in the first exemplary embodiment. The same constituent element is denoted by the same reference numeral, and redundant description thereof is omitted.

FIG. 7 is a flowchart for describing an operation of the CPU 101 when the information processing apparatus is activated. The difference between FIG. 5 and FIG. 7 is only the processing in step S506 to step S508, and the processing in the other steps is the same, so redundant description thereof is omitted.

In step S706, the CPU 101 copies all the data in the storage 310 to the storage 300.

In step S707, after all the data in storage 310 is copied to the storage 300, the CPU 101 reconstructs the partitions of the storage 310 as the Temp image area. By performing the processing in step S706 and step S707, the contents of the storage 300 and the contents of the storage 310 are exchanged with each other.

In step S708, the CPU 101 causes the operation unit 109 to display a message that the system has been restored by exchanging the partitions because the storage 300 and the storage 310 have been exchanged with each other compared with the configuration at the time of the previous activation.

In FIG. 7, when the CPU 101 ends the processing through the flow in the case of YES in step S505, the MFP has been restored to a normal state, in which all the functions can be used.

The following describes an exemplary partition configuration in a case where the storages have not been exchanged with each other since the previous activation, an exemplary partition configuration in a case where the storages have been exchanged with each other, and an exemplary partition configuration to which the present exemplary embodiment has been applied, with reference to FIGS. 8A to 8D.

Figure 8A:
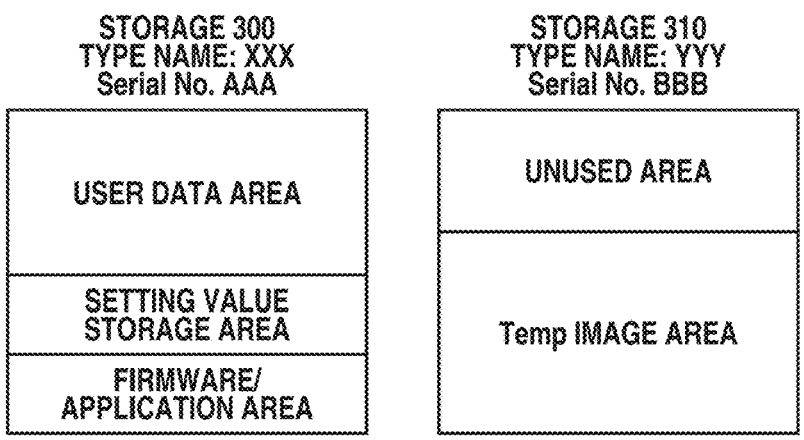
FIGS. 8A, 8B, 8C and 8D are diagrams each illustrating a partition configuration in a case where the storages have been exchanged with each other since the previous activation.

FIG. 8A illustrates an exemplary data partition configuration of the storage 300 and the storage 310 in a state where normal activation succeeded at the time of the previous activation, which is the same as the configuration illustrated in FIG. 6A, and thus redundant description thereof is omitted.

Figure 8B:
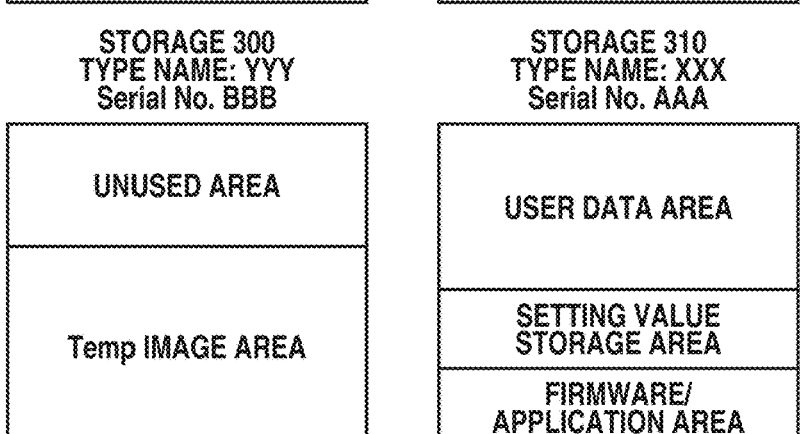

FIG. 8B illustrates the exemplary partition configuration of the storage 300 and the storage 310, in which the two storages are exchanged with each other and connected at the time of current activation, which is the same as the configuration illustrated in FIG. 6B, and thus redundant description thereof is omitted.

Figure 8C:
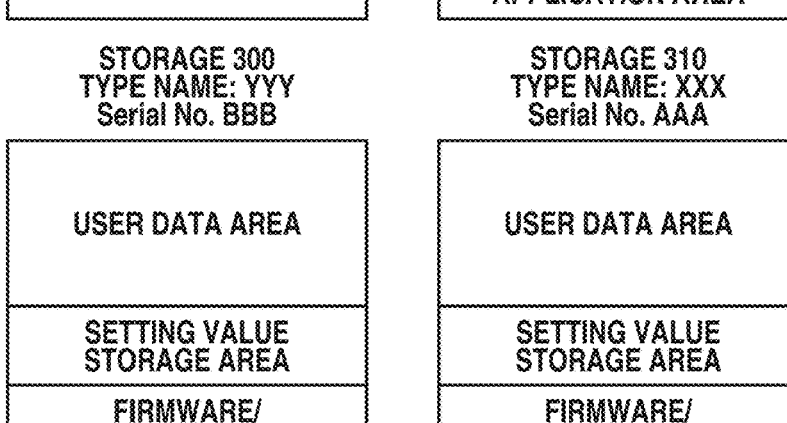

FIG. 8C illustrates an example of the state where all the data in the storage 310 is copied to the storage 300 in step S706. The whole of the storage is copied and the data including the partitions is copied, and thus it goes without saying that the contents of the standard partition table stored in the storage 300 are also changed.

Figure 8D:
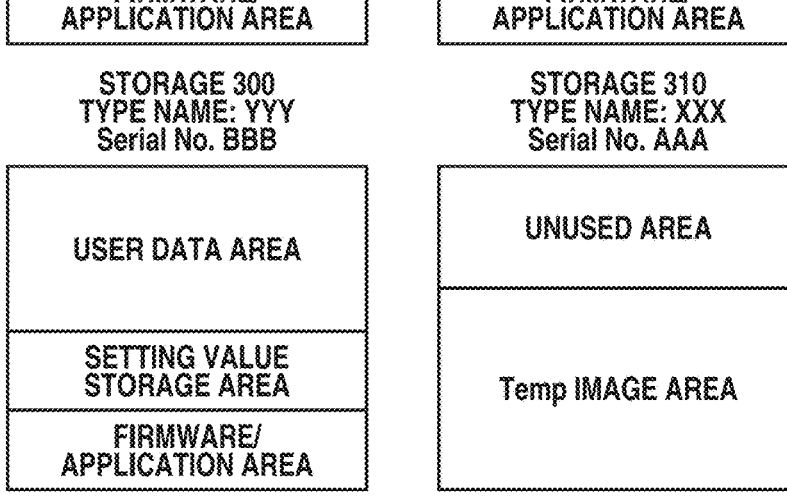

FIG. 8D illustrates an exemplary state in which the CPU 101 reconfigures the partitions of the storage 310 as the Temp image area in step S707.

In this state, although the storages themselves have been exchanged with each other from the state illustrated in FIG. 8A, the contents of data have returned to the same state illustrated in FIG. 8A, and the storage in which important data is stored is to be provided with the power supply from the power ensuring circuit 410.

As described above, the present exemplary embodiment can simultaneously reduce a circuit size, cut costs of circuits, and prevent a loss of data to be protected when the storages have been exchanged with each other. According to the present exemplary embodiment, even if the storages themselves have been exchanged with each other, the contents of data have returned to the original state before the exchange. In this way, the information processing apparatus can continue an operation without exchanging the storages again.

While the present disclosure has been described with reference to the various examples and exemplary embodiments, the gist and the scope of the present disclosure are not limited to specific descriptions in the present specification.

The present disclosure can be achieved by installing a program that achieves one or more functions of the exemplary embodiments in the system or the apparatus through a network or a storage medium, and one or more processors in the system or a computer of the apparatus reading and executing the program. This can be achieved by a circuit (for example, Application Specific Integrated Circuit; ASIC) having one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-047612, filed Mar. 14, 2019, which is hereby incorporated by reference herein in its entirety.

What is claimed is:

1. An information processing apparatus comprising:
   a controller configured to control a first storage and a second storage, the first storage connected to a first system and storing at least data necessary for activating the information processing apparatus, and the second storage connected to a second system and not storing the data necessary for activating the information processing apparatus;
   a power supply unit configured to supply power to the information processing apparatus;
   a power controller configured to control power supply to the first storage and power supply to the second storage and to detect reduction in voltage of power supply to the information processing apparatus;
   an ensuring circuit arranged in the first system and configured to maintain an operation of the first storage when the power controller detects the reduction in voltage of the power supply to the information processing apparatus, and
   a memory configured to store a serial number of the first storage in association with an identifier for the first system and a serial number of the second storage in association with an identifier for the second system,
   wherein the controller is further configured to perform (i) a first comparison comparing a serial number of a storage that is used as the first storage connected to the first system at a time of previous successful activation of the information processing apparatus, with a serial number of a storage that is used as the first storage connected to the first system at a time of current activation of the information processing apparatus, and (ii) a second comparison comparing the serial number of the storage that is used as the first storage connected to the first system at the time of previous successful activation of the information processing apparatus with a serial number of a storage that is used as the second storage connected to the second system at the time of current activation of the information processing apparatus, and
   wherein the controller is further configured to cause at least the data to be copied from the storage that is used as the second storage connected to the second system at the time of current activation of the information processing apparatus, to the storage that is used as the first storage connected to the first system at the time of current activation of the information processing apparatus in a case where the serial numbers are different from each other as a result of the first comparison and the serial numbers are identical to each other as a result of the second comparison.

2. The information processing apparatus according to claim 1, wherein the controller is configured to operate one or more of functions of the information processing apparatus by using the data necessary for activating the information processing apparatus copied from the storage that is used as the second storage connected to the second system at the time of current activation of the information processing apparatus, to the storage that is used as the first storage connected to the first system at the time of current activation of the information processing apparatus.

3. The information processing apparatus according to claim 2, wherein the power controller is configured to stop the power supply to the second storage after the data necessary for activating the information processing apparatus is copied.

4. The information processing apparatus according to claim 2, further comprising a display configured to notify a user of information,
wherein the display is configured to notify the user that one or more of the functions of the information processing apparatus are operable.

5. The information processing apparatus according to claim 4, wherein the display is configured to notify the user that the information processing apparatus is unable to be activated in a case where the serial numbers are different from each other as a result of the first comparison and the serial numbers are different from each other as a result of the second comparison.

6. The information processing apparatus according to claim 1, wherein the data necessary for activating the information processing apparatus is data for firmware and an application.

7. The information processing apparatus according to claim 6, wherein the controller is further configured to cause data related to a setting value to be copied from the storage that is used as the second storage connected to the second system at the time of current activation of the information processing apparatus to the storage that is used as the first storage connected to the first system at the time of current activation of the information processing apparatus, in a case where the serial numbers are different from each other as a result of the first comparison and the serial numbers are identical to each other as a result of the second comparison.

8. The information processing apparatus according to claim 1, wherein the controller is configured to cause all data stored in the storage that is used as the second storage connected to the second system at the time of current activation of the information processing apparatus to be copied to the storage that is used as the first storage connected to the first system at the time of current activation of the information processing apparatus, in a case where the serial numbers are different from each other as a result of the first comparison and the serial numbers are identical to each other as a result of the second comparison.

9. The information processing apparatus according to claim 8, further comprising a display configured to notify a user of information,
wherein the display is configured to notify the user that data stored in the storage that is used as the first storage connected to the first system at the time of current activation of the information processing apparatus and all of the data stored in the storage that is used as the second storage connected to the second system at the time of current activation of the information processing apparatus have been exchanged with each other.

10. The information processing apparatus according to claim 1, wherein the controller is further configured to perform the first comparison and, in a case where the serial numbers are identical to each other, read and execute the data necessary for activating the information processing apparatus from the storage that is used as the first storage connected to the first system at the time of current activation of the information processing apparatus.

11. The information processing apparatus according to claim 10, wherein the storage that is used as the second storage connected to the second system at the time of the previous successful activation of the information processing apparatus is a storage set to store data related to a copy operation.

12. The information processing apparatus according to claim 1, wherein the ensuring circuit is not arranged in the second system.

13. The information processing apparatus according to claim 1, wherein the ensuring circuit includes a circuit configured to disconnect the first storage connected to the first system at the time of current activation of the information processing apparatus, from the power supply unit in response to the power controller detecting the reduction in voltage of the power supply.

14. The information processing apparatus according to claim 1, wherein the ensuring circuit includes a capacitor configured to hold an electric charge.

15. The information processing apparatus according to claim 1, wherein each of the first storage and the second storage is a solid-state drive (SSD).

16. The information processing apparatus according to claim 1, wherein the first storage includes a volatile storage unit and a nonvolatile storage unit and is set to store data stored in the volatile storage unit in the nonvolatile storage unit in response to the power controller detecting the reduction in voltage of the power supply to the information processing apparatus.

17. A control method of an information processing apparatus,
wherein the information processing apparatus includes:
a power supply unit configured to supply power to the information processing apparatus;
a power controller configured to control power supply to a first storage and power supply to a second storage and to detect reduction in voltage of power supply to the information processing apparatus;
an ensuring circuit arranged in the first system and configured to maintain an operation of the first storage in a case where the power controller detects the reduction in voltage of the power supply to the information processing apparatus; and
a memory configured to store a serial number of the first storage in association with an identifier for the first system and a serial number of the second storage in association with an identifier for the second system, and
wherein the control method comprises:
controlling the first storage and a second storage, the first storage connected to a first system, and the second storage connected to a second system;
performing (i) a first comparison comparing a serial number of a storage that is used as the first storage connected to the first system at a time of previous successful activation of the information processing apparatus with a serial number of a storage that is used as the first storage connected to the first system at a time of current activation of the information processing apparatus and (ii) a second comparison comparing the serial number of the storage that is used as the first storage connected to the first system at the time of previous successful activation of the information processing apparatus with a serial number of a storage that is used as the second storage connected to the second system at the time of current activation of the information processing apparatus; and
causing at least data necessary for activating the information processing apparatus to be copied from the storage that is used as the second storage connected to the second system at the time of current activation of the information processing apparatus, to the storage that is used as the first storage connected to the first system at the time of current activation of the information processing apparatus in a case where the serial numbers are different from each other as a result of the first comparison and the serial numbers are identical to each other as a result of the second comparison.

* * * * *